US008961082B2

(12) United States Patent
Jeon et al.

(10) Patent No.: US 8,961,082 B2
(45) Date of Patent: Feb. 24, 2015

(54) ONE-TOUCH CHAMFERING-AMOUNT ADJUSTMENT DEVICE FOR A CHAMFERING MACHINE

(75) Inventors: Byung-Woo Jeon, Daejeon (KR); Byung-Kwon Jeon, Daejeon (KR)

(73) Assignee: Daesung Golden Technology Co., Ltd., Daejeon (KR)

( * ) Notice: Subject to any disclaimer, the term of this patent is extended or adjusted under 35 U.S.C. 154(b) by 725 days.

(21) Appl. No.: 13/265,234

(22) PCT Filed: Jan. 13, 2011

(86) PCT No.: PCT/KR2011/000260
§ 371 (c)(1),
(2), (4) Date: Oct. 19, 2011

(87) PCT Pub. No.: WO2011/099699
PCT Pub. Date: Aug. 18, 2011

(65) Prior Publication Data
US 2012/0039682 A1    Feb. 16, 2012

(30) Foreign Application Priority Data
Feb. 12, 2010  (KR) .................. 10-2010-0013380

(51) Int. Cl.
*B23C 1/20* (2006.01)
*B23C 5/10* (2006.01)
*B23C 3/12* (2006.01)

(52) U.S. Cl.
CPC . *B23C 3/122* (2013.01); *B23C 5/10* (2013.01); *B23C 2220/16* (2013.01); *B23C 2255/08* (2013.01); *B23C 2260/04* (2013.01)
USPC ....... 409/138; 409/182; 409/206; 144/136.95

(58) Field of Classification Search
CPC ............ B23C 1/20; B23C 3/126; B23C 3/12; B23C 5/10

USPC .................. 409/138, 181, 182, 175, 206; 144/136.95, 154.5
See application file for complete search history.

(56) References Cited

U.S. PATENT DOCUMENTS

| 1,058,149 | A | * | 4/1913 | Campbell | 408/112 |
| 2,231,864 | A | * | 2/1941 | Abel | 408/202 |

(Continued)

FOREIGN PATENT DOCUMENTS

| DE | 2514064 | A | * | 10/1976 | B23B 41/00 |
| DE | 2549153 | A | * | 5/1977 | B23B 41/00 |

(Continued)

OTHER PUBLICATIONS
English Language Abstract of JP10-086011 A.
(Continued)

*Primary Examiner* — Daniel Howell
*Assistant Examiner* — Ryan Rufo
(74) *Attorney, Agent, or Firm* — Rabin & Berdo, P.C.

(57) ABSTRACT

The present invention relates to a one-touch chamfering-amount adjustment device for a chamfering machine which specifically carries out a chamfering process on the welding bead surfaces of objects to be processed (such as metal sheet materials and pipes). In the present invention, the moment after a chamfering-amount-adjustment piece has been manipulated so as to rotate, a position-setting pin is inserted into a securing recess in the chamfering-amount-adjustment piece and as this happens the chamfering amount is precisely adjusted in units and at the same time locking to the predetermined chamfering amount is automatically maintained, yet nevertheless the adjustment of the chamfering amount is achieved in a straightforward fashion with one touch, and, when the chamfering-amount-adjustment piece is manipulated, a cutter shaft moves vertically and as it does so the chamfering amount is adjusted in such a way that the chamfering amount can be immediately and rapidly adjusted even during working regardless of any cutter rotating action.

5 Claims, 7 Drawing Sheets

(56) References Cited

U.S. PATENT DOCUMENTS

| | | | |
|---|---|---|---|
| 2,242,510 A * | 5/1941 | Cogsdill | 408/112 |
| 2,301,151 A * | 11/1942 | Spievak | 408/112 |
| 2,409,377 A * | 10/1946 | Miller | 408/112 |
| 2,608,114 A * | 8/1952 | Martin et al. | 408/112 |
| 2,706,917 A * | 4/1955 | Hill | 408/94 |
| 2,710,549 A * | 6/1955 | Cogsdill | 408/112 |
| 2,874,616 A * | 2/1959 | Cardinal | 408/72 R |
| 4,115,017 A * | 9/1978 | Wilhelmsson | 408/14 |
| 4,647,260 A * | 3/1987 | O'Hara et al. | 408/241 S |
| 4,881,857 A * | 11/1989 | Tanaka et al. | 409/138 |
| 5,145,298 A * | 9/1992 | Marantette | 409/135 |
| 6,203,253 B1 * | 3/2001 | Perrault | 408/84 |
| 6,779,954 B2 * | 8/2004 | Tomayko | 409/182 |
| 7,261,499 B2 * | 8/2007 | Mathis et al. | 408/202 |
| 7,635,242 B2 | 12/2009 | Jeon et al. | |
| 2003/0133764 A1 * | 7/2003 | Erickson et al. | 408/97 |
| 2004/0052600 A1 * | 3/2004 | Pientka et al. | 409/182 |
| 2006/0102248 A1 * | 5/2006 | Cooper et al. | 144/136.95 |
| 2009/0145279 A1 | 6/2009 | Jeon et al. | |
| 2010/0092261 A1 * | 4/2010 | Rieth | 409/182 |
| 2010/0215450 A1 * | 8/2010 | Santamarina et al. | 408/113 |

FOREIGN PATENT DOCUMENTS

| | | | | |
|---|---|---|---|---|
| JP | 58-137507 A | * | 8/1983 | B23B 41/00 |
| JP | 10-086011 A | | 4/1998 | |
| KR | 10-1998-0087604 A | | 12/1998 | |
| KR | 10-0575201 B1 | | 4/2006 | |
| KR | 10-0901160 B1 | | 6/2009 | |
| KR | 10-0905320 B1 | | 7/2009 | |
| KR | 10-0912485 B1 | | 8/2009 | |

OTHER PUBLICATIONS

English Language Abstract of KR10-0575201 B1.
English Language Abstract of KR10-0901160 B1.
English Language Abstract of KR10-0905320 B1.
English Language Abstract of KR10-0912485 B1.
English Language Abstract of KR10-0265915 B1 which is a patent publication of KR10-1998-0087604 A.
International Search Report of PCT/KR2011/000246 mailed on Sep. 20, 2011.

* cited by examiner

ONE-TOUCH CHAMFERING-AMOUNT ADJUSTMENT DEVICE FOR A CHAMFERING MACHINE

BACKGROUND OF THE INVENTION

1. Field of the Invention

The present invention relates to a beveling machine for beveling a weld bead surface on a workpiece, and more particularly, a one-touch bevel cut depth controller for immediately and easily controlling the depth of bevel cut by a one-touch method, regardless of the rotational operation of a cutter.

2. Description of the Related Art

Generally, as the prior work for welding in a natural gas pipeline construction field or industrial plant pipe laying construction field, a relatively large sized workpiece (metal panel, pipe or the like) is cut according to a length requirement and then an edge of the workpiece is beveled so that a weld bead surface is shaped on the edge of the workpiece. When the workpiece with the shaped bead surface is connected with the other workpiece with the shaped bead surface, the bead surfaces between the workpieces form a weld bead receiving opening in a unified ridge shape by which the workpieces are easily integrally connected together, through welding work.

However, in a relatively large sized workpiece, the depth of bevel cut to shape a weld bead surface is great. Therefore, it takes a long time to cut a bevel on the large workpiece by using a typical small beveling tool. Moreover, it is difficult to accurately measure the depth of bevel cut and thus the quality of work is low.

Accordingly, a dedicated large-capacity beveling machine to process a bead surface for welding is required in the industrial fields. Further, for the proper functioning of the large-capacity beveling machine, it must perform to easily control the depth of bevel cut and to freely control the gradient of the bead surface.

Considering the aforementioned problems, the applicant of the present invention presented a beveling machine to process a weld bead surface in Korean Patent Registration No. 912485 (hereinafter, referred to as the prior art 1).

However, in the prior art 1, it is difficult to easily control the depth of bevel cut by a unit of 0.1 mm through a one-touch operation. In this beveling machine, the depth of bevel cut is adjusted by a rack by an operator's (arbitrary) setting, depending on his/her intention. Consequently, the accuracy is low and it takes a long time to control the depth of bevel cut. Specifically, after the depth of bevel cut is controlled, a special locking control unit needs to be tightened to prevent the bevel setting from being loosened. Thus, the inconvenience in using the beveling machine of the prior art 1 generally increases.

The applicant of the present invention presented a beveling tool to easily control the depth of bevel cut in Korean Patent Registration No. 575201 (hereinafter, referred to as the prior art 2) as prior art teaching a beveling tool to shape the slanted surface at the edge of a workpiece. The prior art 2 provides the effects of minutely controlling the depth of bevel cut by a simple method of using a bevel cut depth controlling unit and accurately maintaining the depth of bevel cut which is automatically controlled at the moment of releasing the bevel cut depth controlling unit which is held.

However, in the prior art 2, since the bevel cut depth controlling unit is pulled downwardly (toward a cutter) to control the depth of bevel cut, the operator's hand may be injured if the hand comes in contact with the cutter. Moreover, since the beveling tool of the prior art 2 comprises an adapter with a special fixed spline to maintain a setting condition of the bevel cut depth controlling unit, it is difficult to manufacture and its size is somewhat cumbersome. During operation, it is impossible to immediately control the depth of bevel cut. After stopping the operation and separating the beveling tool from the workpiece, it is possible to control the depth of bevel cut. Therefore, it takes a long time to control the depth of bevel cut. That is, the prior art 2 also has problems which need to be solved and also it needs to be improved upon.

SUMMARY OF THE INVENTION

To solve the above problems of the conventional art, it is therefore an object of the present invention to provide a one-touch bevel cut depth controller, whereby the depth of bevel cut is accurately controlled by a calibrated setting since a location setting pin is fit into a securing opening of a bevel cut depth controlling unit at the moment when the bevel cut depth controlling unit is released after it is operated to rotate and simultaneously since the setting of the bevel cut depth is automatically locked and maintained, to easily control the depth of bevel cut through a one-touch method.

It is also another object of the present invention to provide a one-touch bevel cut depth controller which comprises an assembly structure to operate the bevel cut depth controlling unit above a cutter so that it is opposite the cutter, to secure high safety by blocking any injury to the operator by the cutter.

It is also another object of the present invention to provide a one-touch bevel cut depth controller in which the depth of bevel cut is controlled during a cutter shaft vertically moves upon the operation of the bevel cut depth controlling unit, so that the depth of bevel cut is immediately and fast controlled during the operation, regardless of the rotational operation of the cutter.

In accordance with an exemplary embodiment of the present invention, there is provided a one-touch bevel cut depth controller in a beveling machine, wherein a movable spline shaft is connected to an upper center of a beveling machine body by a screw, a bevel cut depth controlling unit is connected to an outside of the movable spline shaft by a spline, a spring housing is integrally connected to an upper end of the movable spline shaft, an elastic spring is interposed between the spring housing and the bevel cut depth controlling unit, location setting pins positioned at an upper part of the beveling machine body in a circumferential direction are fit into a plurality of securing openings formed at a lower part of the bevel cut depth controlling unit in a circumferential direction, and a cutter shaft is rotatably installed in the movable spline shaft.

BRIEF DESCRIPTION OF THE DRAWINGS

The above and other features and advantages of the present invention will become more apparent by describing in detail exemplary embodiments thereof with reference to the attached drawings in which.

Figure 1:
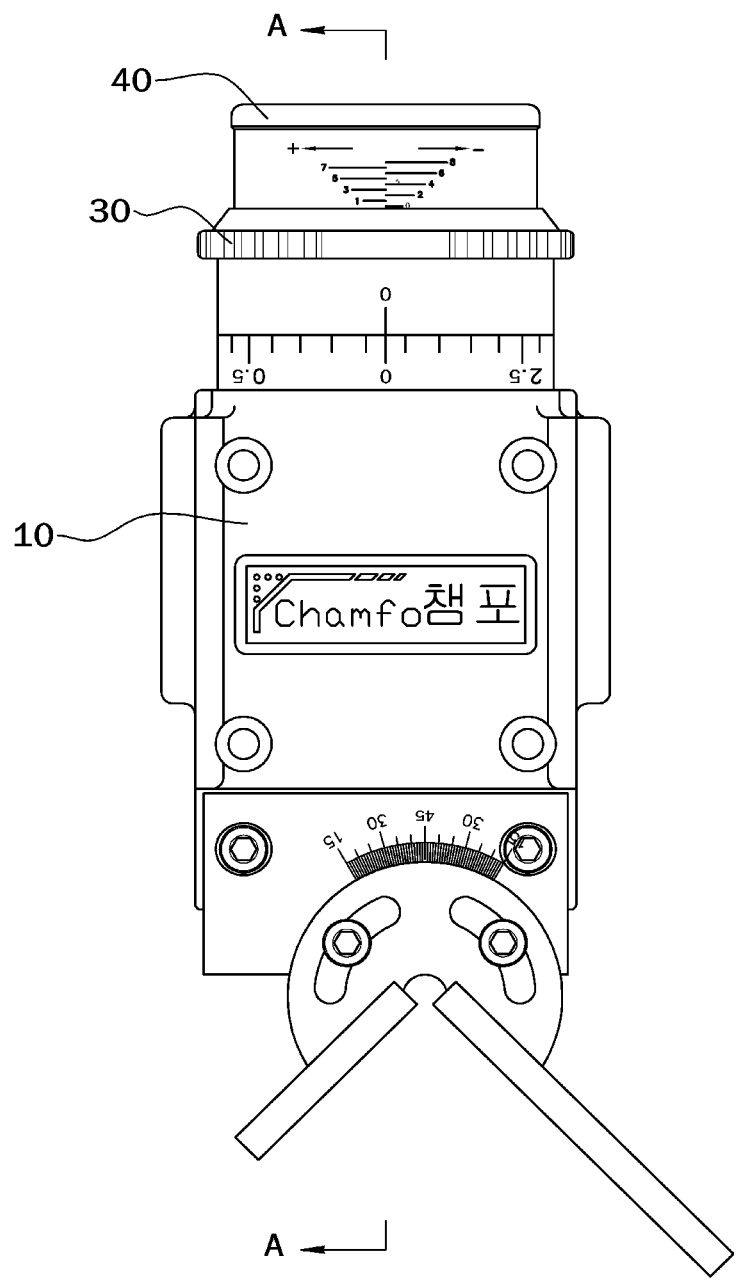
FIG. 1 is a side view of a beveling machine applying a one-touch bevel cut depth controller according to an embodiment of the present invention.
Figure 2:
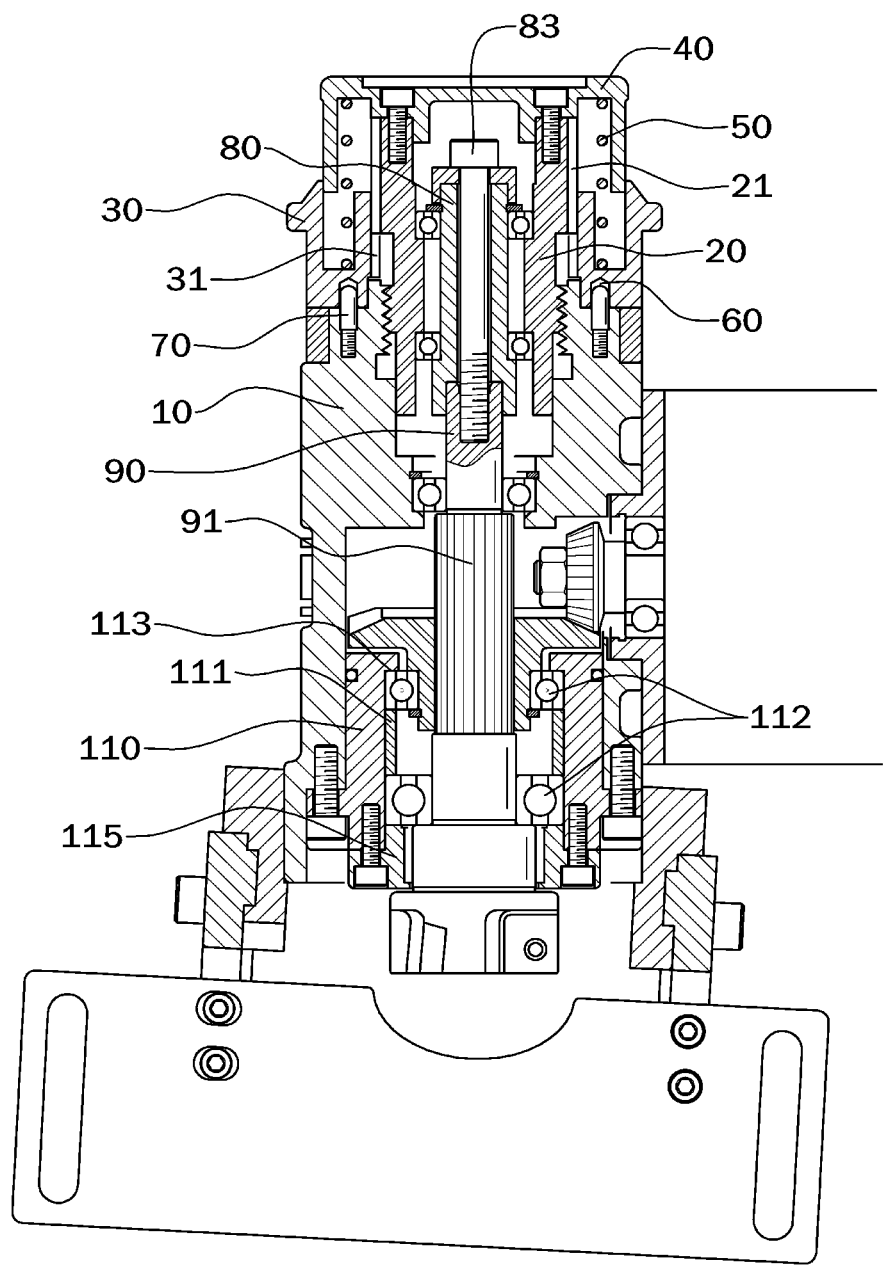
FIG. 2 is a sectional view taken along line A-A of FIG. 1.

BRIEF DESCRIPTION OF REFERENCE
NUMBERS OF MAJOR ELEMENTS

| | |
|---|---|
| 10: bevelling machine body | 12: cutter operation unit |
| 20: movable spline shaft | 21: first spline |
| 30: bevel cut depth controlling unit | 31: second spline |
| 32: guide groove | 40: spring housing |
| 41, 83: locking members | 50: elastic spring |
| 60: securing opening | 70: location setting pin |
| 80: sleeve shaft | |
| 85: unintentional detachment preventing cap | |
| 90, 90a: cutter shaft | 110: bearing housing |

DETAILED DESCRIPTION OF THE INVENTION

The present invention will now be described more fully hereinafter with reference to the accompanying drawings, in which preferred embodiments of the invention are shown. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Accordingly, while example embodiments of the present invention are capable of various modifications and alternative forms, embodiments of the present invention are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention.

A one-touch bevel cut depth controller according to the present invention to achieve the aforementioned objects comprises in outline: a beveling machine body 10, wherein a spline shaft connection unit 11 is positioned at an upper center part of the beveling machine body 10 and a cutter operation unit 12 is positioned at a lower center part thereof and the spline shaft connection unit 11 and the cutter operation unit 12 are operatively connected to each other; a movable spline shaft 20 to be vertically movably connected to the spline shaft connection unit 11 by a screw, wherein a first spline 21 is positioned around an upper outer circumference of the movable spline shaft 20; a bevel cut depth controlling unit 30, wherein a second spline 31 surrounding an outside of the movable spline shaft 20 is positioned around an inner circumference of the bevel cut depth controlling unit 30 and moves by a vertical sliding motion, the second spline 31 is connected to the first spline 21 by a spline; a spring housing 40 to be inserted into a guide groove 32 formed at an upper part of the bevel cut depth controlling unit 30 and integrally attached to an upper end of the movable spline shaft 20; an elastic spring 50 to be interposed between an inner surface of the spring housing 40 and the guide groove 32 of the bevel cut depth controlling unit 30; a plurality of securing openings 60 formed at a lower part of the bevel cut depth controlling unit 30 in a circumferential direction; a plurality of location setting pins 70 to be positioned at an upper outer part 15 of the spline shaft connection unit 11 in a circumferential direction and to be selectively fit into the securing openings 60, to fix the location of the bevel cut depth controlling unit 30 and maintain the locking thereof; a sleeve shaft 80 to be rotatably installed in the movable spline shaft 20; and a cutter shaft 90 to be rotatably installed in a bearing housing 110 installed to be inserted into a lower part of the cutter operation unit 12, wherein the cutter shaft 90 is integrally connected to a lower end of the sleeve shaft 80 so that the cutter shaft 90 and the sleeve shaft 80 operatively rotate and vertically move together.

Hereinafter, the present invention having the constitution described in outline will be described in more detail, so as to be easily carried out.

The spline shaft connection unit 11 and the cutter operation unit 12 are respectively installed in the upper and lower centre positions of the bevelling machine body 10 so as to be operatively connected to each other. A power input unit 14 is positioned at a back side 13 of the bevelling machine body 10. The power input unit 14 is operatively connected to the cutter operation unit 12 outside.

A lower part of the movable spline shaft 20 is fit into the spline shaft connection unit 11 so that both are connected to each other by a screw. The movable spline shaft 20 is vertically movable according to a selective rotational operation. The first spline 21 is positioned at an upper outer circumference of the movable spline shaft 20.

The bevel cut depth controlling unit 30 is positioned so as to surround the outside of the movable spline shaft 20 and to be movable by a vertical sliding motion. To this end, the second spline 31 positioned at an inner circumference of the bevel cut depth controlling unit 30 is structured to be connected to the first spline 21 of the movable spline shaft 20 by a spline.

Therefore, the bevel cut depth controlling unit 30 alone is smoothly movable vertically, and upon the rotational operation, the movable spline shaft 20 and the bevel cut depth controlling unit 30 are operatively and integrally connected to each other and rotate.

The guide groove 32 in a round shape is formed on a top of the bevel cut depth controlling unit 30. When a lower end of the spring housing 40 is inserted into the guide groove 32, a locking member 1 passes through the spring housing 40 and is connected to an upper end of the movable spline shaft 20 by a screw, so that the spring housing 40 is maintained to be integrally attached to the upper end of the movable spline shaft 20.

The elastic spring 50 is interposed between the inner surface of the spring housing 40 and the guide groove 32 of the bevel cut depth controlling unit 30. Accordingly, at the moment of releasing the bevel cut depth controlling unit 30 which has been pulled upwardly, the bevel cut depth controlling unit 30 automatically moves downwardly by elasticity and returns to its original state.

A plurality of securing openings 60 are formed at a lower part of the bevel cut depth controlling unit 30. The securing openings 60 are equally spaced from each other in a circumferential direction. A plurality of location setting pins 70 are positioned at an upper outer part of the spline shaft connection unit 11 in a circumferential direction. The location setting pins 70 are selectively fit into the securing openings 60.

The location setting pin 70 includes a screw part 71 formed at its lower part. The screw part 71 is structured to be connected to a screw hole 72 formed on an upper outer part 15 of the spline shaft connection unit 11. At the moment when the location setting pin 70 is selectively fit into the securing opening 60, the bevel cut depth controlling unit 30 stops rotating and simultaneously the location is fixed. Accordingly, the depth of bevel cut which is set by the bevel cut depth controlling unit 30 is automatically locked and maintained. In this manner, the depth of bevel cut is more easily controlled by a one-touch method.

Further, the location setting pin 70 is structured to be attachable/detachable to/from the bevelling machine body 10, instead of being integrally with the bevelling machine body 10. Thus, when the location setting pin 70 is bent or broken since it is used for a long time, it is easily separated to be replaced. Accordingly, the convenience in maintenance and repair is provided.

A pair of bearing supporting protrusions 22 is vertically positioned to be spaced apart from each other around an inner centre of the movable spline shaft 20. Each bearing 23 is stably installed in each bearing supporting protrusion 22. The sleeve shaft 80 is rotatably installed through the bearings 23.

A protrusion 81 is formed around a lower outer circumference of the sleeve shaft 80. The protrusion 81 is retained by a lower part of each bearing 23, thereby preventing the sleeve shaft 80 from moving up. A snap ring 82 is fit into the upper outer circumference of the sleeve shaft 80. The snap ring 82 is secured against an upper side of each upper bearing 23 so that the sleeve shaft 80 is prevented from moving down.

The bearding housing 110 is fixedly inserted into a lower part of the cutter operation unit 12. The cutter shaft 90 is rotatably installed in the bearing housing 110. The cutter shaft 90 is integrally connected to a lower end of the sleeve shaft 80 so that the cutter shaft 90 and the sleeve shaft 80 are operatively connected to rotate together and smoothly move vertically.

The connection structure of the cutter shaft 90 and the sleeve shaft 80 will be described in more detail. The cutter shaft 90 is inserted into the lower end of the sleeve shaft 80. A locking member 83 is positioned on a top of the sleeve shaft 80 and passes through the inside of the sleeve shaft 80. The locking member 83 is connected to the cutter shaft 90 by a screw, so that the strong connection state of the cutter shaft 90 and the sleeve shaft 80 is maintained.

Further, since the snap ring 82 which is fit into the outer circumference of the sleeve shaft 80 intensively receives the load of the cutter shaft 90 and sleeve shaft 80, it droops down and thus it may be separated or broken. In this case, the cutter shaft 90 is unable to smoothly rotate. Considering this problem, an unintentional detachment preventing cap 85 is fit into a top end of the sleeve shaft 80 and the locking member 83 passes through the unintentional detachment preventing cap 85. The technology of positioning the snap ring 82 closely to a lower side of the unintentional detachment preventing cap 85 is added so that the snap ring 82 is not separated and is strongly fixed.

Figure 7:
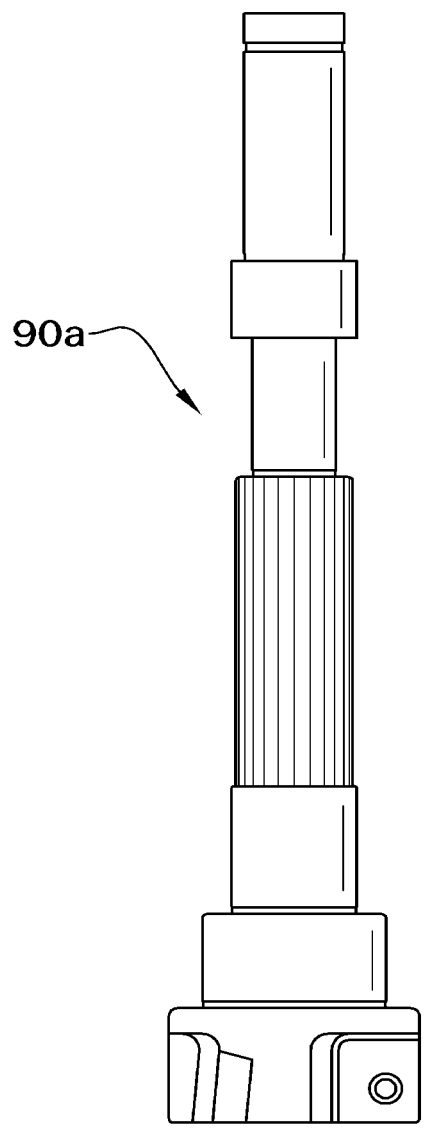
FIG. 7 is a front view of a cutter shaft according to the other embodiment of the present invention.

As described above, the cutter shaft 90 is structured to be integrally connected to the sleeve shaft 80 which is another constituent. However, as illustrated in FIG. 7, the sleeve shaft 80 and the cutter shaft 90 may be formed in a single unit, to carry out a cutter shaft 90a in a new concept. For the structural simplification, an upper part of the cutter shaft 90a is rotatably installed in the movable spline shaft 20 and a lower part thereof is rotatably installed in the bearing housing 110 inserted into the lower part of the cutter operation unit 12.

In the bearing housing 110 stably supporting only the cutter shaft 90 or 90a to be rotatable, bearings 112 are each fit above and under a spacer 111 inserted into an inner centre of the bearing housing 110. Each of the bearing 112 as fit above the spacer 111 is secured by a bearing supporting protrusion 113 formed at the bearing housing 110, so that the bearing 112 is prevented from unintentionally separating upwardly. A stopper 115 rotatably surrounding the cutter shaft 90 or 90a is fit into a lower end of the bearing housing 110, so that the bearing 112 is prevented from being unintentionally detached downwardly.

Therefore, the cutter shaft 90 or 90a is stably and rotatably supported by a pair of the upper and lower bearings 112.

Figure 3:
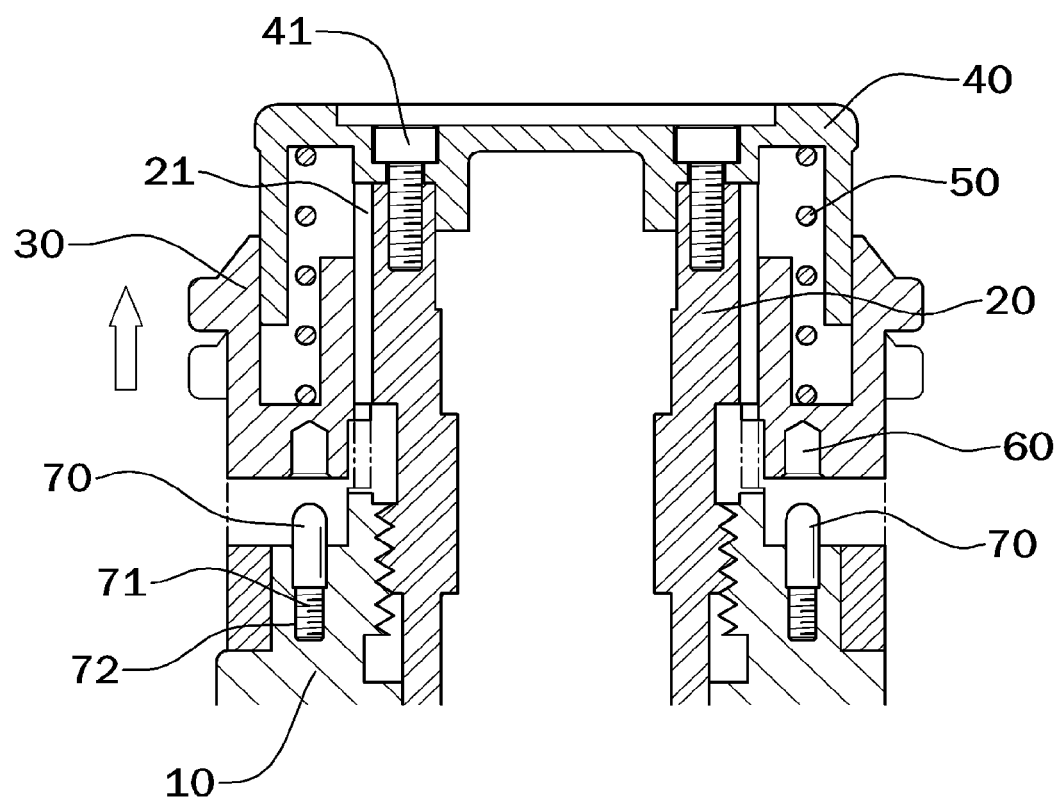
FIG. 3 is a longitudinal sectional view of a bevel cut depth controlling unit being pulled upwardly.
Figure 4:
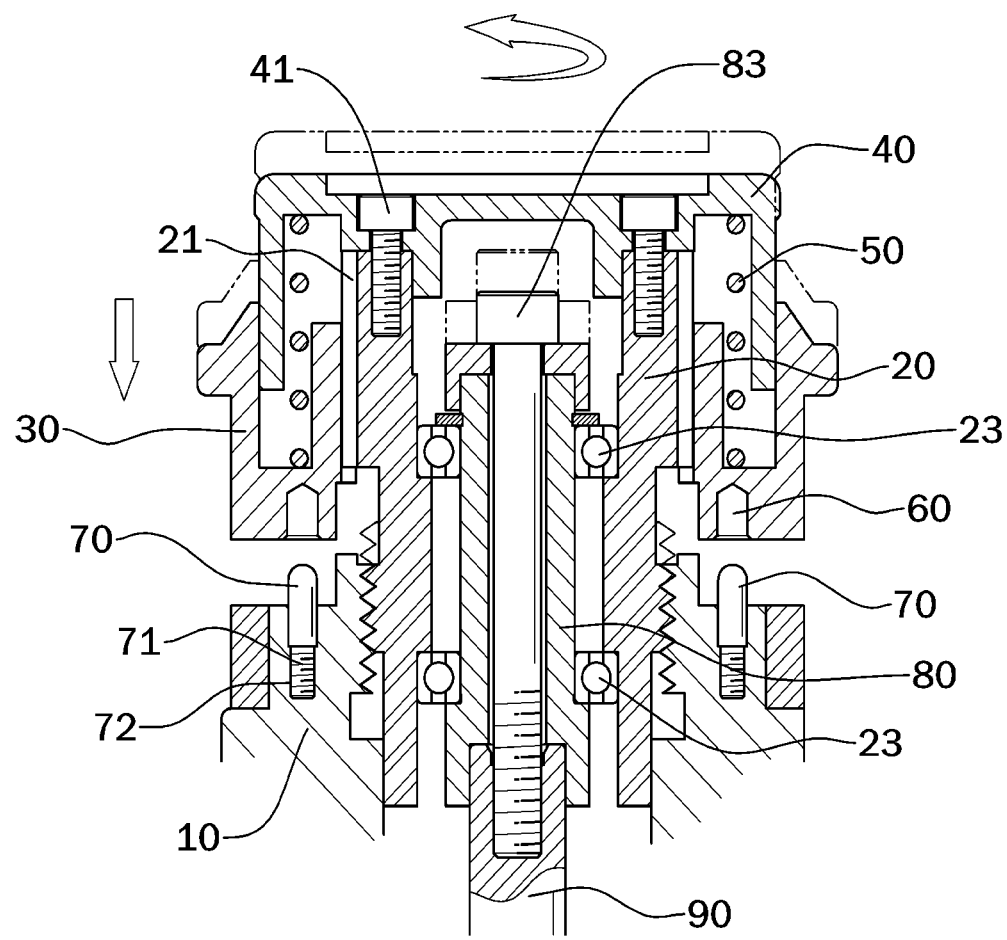
FIG. 4 is a longitudinal sectional view of the bevel cut depth controlling unit being rotated.
Figure 5:
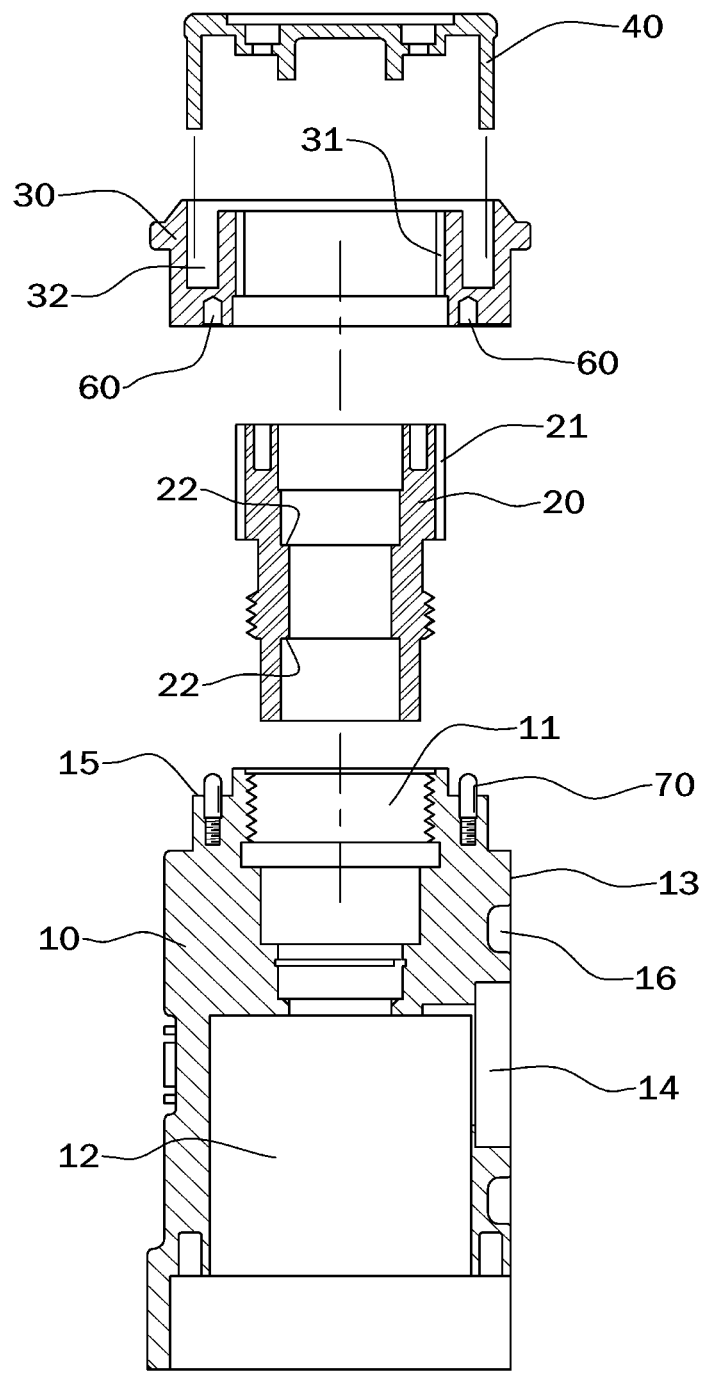
FIG. 5 is a longitudinal sectional view of a beveling machine body, a movable spline shaft, a bevel cut depth controlling unit and a spring housing as separated.
Figure 6:
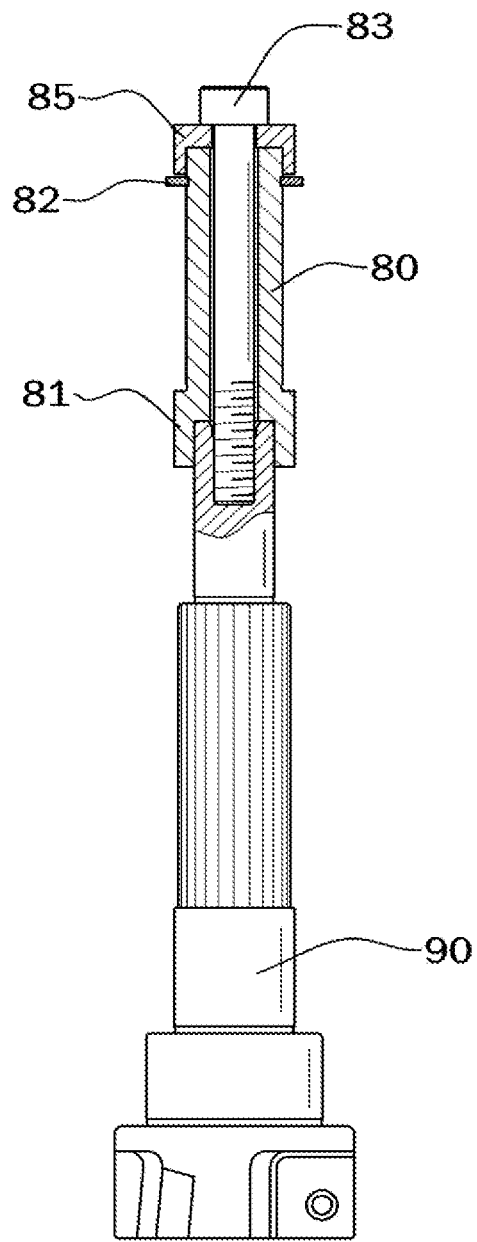
FIG. 6 is a longitudinal sectional view of a sleeve shaft and a cutter shaft.

According to the present invention in the above-described constitution, when the bevel cut depth controlling unit 30 is pulled upwardly to rotate as illustrated in FIGS. 3 and 4, the bevel cut depth controlling unit 30 and the movable spline shaft 20 rotate and simultaneously move vertically and the cutter shaft 90 integrally connected to the movable spline shaft 20 moves, thereby making it possible to fast and easily control the depth of bevel cut. At the moment when the bevel cut depth controlling unit 30 is released, the location fitting pins 70 are fit into the securing openings 60 of the bevel cut depth controlling unit 30, thereby automatically locking the depth of bevel cut being accurately set by a calibrated setting. Accordingly, it is obvious that the depth of bevel cut is easily controlled by the one-touch method.

In accordance with the present invention, at the moment when the bevel cut depth controlling unit is released after it is operated to rotate, the location setting pins are fit into the securing openings of the bevel cut depth controlling unit and the depth of bevel cut according to an operator's selection is accurately controlled by a calibrated setting and simultaneously the bevel cut depth as set is automatically locked and maintained, thereby more easily controlling the depth of bevel cut by a one-touch method.

Further, the depth of bevel cut is controlled by pulling the bevel cut depth controlling unit upwardly in the opposite direction to the cutter, thereby blocking the contact of the operator's hand with the cutter and thus efficiently preventing the operator's hand from being injured. This secures high safety. In addition, since the main constitution according to the control of the depth of bevel cut is simple, the beveling machine is easily manufactured and the size of the beveling machine is minimized.

Furthermore, the depth of bevel cut is controlled as the cutter shaft moves vertically when the bevel cut depth controlling unit is operated. Therefore, the depth of bevel cut is immediately and fast controlled even during operation, regardless of the rotational operation of the cutter. This provides speed and convenience.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bevel cut depth controller in a beveling machine comprising:
   a beveling machine body having
      a spline shaft connection unit positioned at an upper center part of the beveling machine body, and
      a cutter operation unit positioned at a lower center part thereof, the spline shaft connection unit and the cutter operation unit being operatively connected to each other;

a movable spline shaft vertically movably connected to the spline shaft connection unit by a screw and including a first spline positioned around an upper outer circumference of the movable spline shaft;

a bevel cut depth controlling unit including a second spline surrounding an outer periphery of the movable spline shaft, the second spline being positioned around an inner circumference of the bevel cut depth controlling unit, movable in a vertical sliding motion and connected to the first spline;

a spring housing inserted into a guide groove formed at an upper part of the bevel cut depth controlling unit and integrally attached to an upper end of the movable spline shaft;

an elastic spring interposed between an inner surface of the spring housing and the guide groove of the bevel cut depth controlling unit;

a plurality of securing openings formed along a lower part of the bevel cut depth controlling unit;

a plurality of location setting pins positioned along an upper outer part of the spline shaft connection unit and selectively fit into the securing openings, to fix the location of the bevel cut depth controlling unit and maintain the locking thereof, each of said plurality of location setting pins including a screw part, the screw part being connected/separated to/from a screw hole formed on an upper outer part of the spline shaft connection unit;

a sleeve shaft rotatably installed in the movable spline shaft;

a bearing housing installed in the cutter operation unit; and a cutter shaft rotatably installed in the bearing housing, wherein the cutter shaft is integrally connected to a lower end of the sleeve shaft so that the cutter shaft and the sleeve shaft operatively rotate and vertically move together.

2. A bevel cut depth controller in a beveling machine comprising:

a beveling machine body, having a spline shaft connection unit positioned at an upper center part of the beveling machine body, and a cutter operation unit positioned at a lower center part thereof, the spline shaft connection unit and the cutter operation unit being operatively connected to each other;

a movable spline shaft vertically movably connected to the spline shaft connection unit by a screw and including a first spline positioned around an upper outer circumference of the movable spline shaft;

a bevel cut depth controlling unit including a second spline surrounding an outer periphery of the movable spline shaft, the second spline being positioned around an inner circumference of the bevel cut depth controlling unit, movable in a vertical sliding motion and connected to the first spline;

a spring housing inserted into a guide groove formed at an upper part of the bevel cut depth controlling unit and integrally attached to an upper end of the movable spline shaft;

an elastic spring interposed between an inner surface of the spring housing and the guide groove of the bevel cut depth controlling unit;

a plurality of securing openings formed along a lower part of the bevel cut depth controlling unit;

a plurality of location setting pins positioned along an upper outer part of the spline shaft connection unit and selectively fit into the securing openings, to fix the location of the bevel cut depth controlling unit and maintain the locking thereof, each of said plurality of location setting pins including a screw part, the screw part being connected/separated to/from a screw hole formed on an upper outer part of the spline shaft connection unit;

a sleeve shaft rotatably installed in the movable spline shaft;

a bearing housing installed in the cutter operation unit; and a cutter shaft rotatably installed in the movable spline shaft and the bearing housing.

3. A bevel cut depth controller in a beveling machine, comprising:

a beveling machine body having a spline shaft connection unit positioned at an upper center part of the beveling machine body, and a cutter operation unit positioned at a lower center part thereof, the spline shaft connection unit and the cutter operation unit being operatively connected to each other;

a movable spline shaft vertically movably connected to the spline shaft connection unit by a screw and including a first spline positioned around an upper outer circumference of the movable spline shaft;

a bevel cut depth controlling unit including a second spline surrounding an outer periphery of the movable spline shaft, the second spline being positioned around an inner circumference of the bevel cut depth controlling unit, movable in a vertical sliding motion and connected to the first spline;

a spring housing inserted into a guide groove formed at an upper part of the bevel cut depth controlling unit and integrally attached to an upper end of the movable spline shaft;

an elastic spring interposed between an inner surface of the spring housing and the guide groove of the bevel cut depth controlling unit;

a plurality of securing openings formed along a lower part of the bevel cut depth controlling unit;

a plurality of location setting pins positioned along an upper outer part of the spline shaft connection unit and selectively fit into the securing openings, to fix the location of the bevel cut depth controlling unit and maintain the locking thereof;

a sleeve shaft rotatably installed in the movable spline shaft;

a bearing housing installed in the cutter operation unit; and a cutter shaft rotatably installed in the bearing housing, wherein the cutter shaft is integrally connected to a lower end of the sleeve shaft so that the cutter shaft and the sleeve shaft operatively rotate and vertically move together, wherein the sleeve shaft comprises a locking member, an unintentional detachment preventing cap, and a snap ring, and wherein the cutter shaft is inserted to a lower end of the sleeve shaft, the locking member is positioned on a top of the sleeve shaft and passes through an inside of the sleeve shaft, so that the locking member is connected to the cutter shaft, the unintentional detachment preventing cap is fit into an upper end of the sleeve shaft and allows the locking member to pass through the sleeve shaft, and the snap ring is fit around an upper outer circumference of the sleeve shaft and is positioned close to a bottom of the unintentional detachment preventing cap, so that the snap ring is prevented from being separated by a load of the cutter shaft and sleeve shaft.

4. The bevel cut depth controller of claim 1, wherein the bearing housing comprises a spacer, bearings, and a stopper, and wherein the spacer is fit into the center of the bearing housing, the bearings are each fit into upper and lower positions of the spacer, so that the cutter shaft is rotatably supported by the bearings, and the stopper is fit into a lower end of the bearing housing, so that the stopper prevents the bearing from unintentionally separating.

5. The bevel cut depth controller of claim 2, wherein the bearing housing comprises a spacer, bearings, and a stopper, and wherein the spacer is fit into the center of the bearing housing, the bearings are each fit into upper and lower positions of the spacer, so that the cutter shaft is rotatably supported by the bearings, and the stopper is fit into a lower end of the bearing housing, so that the stopper prevents the bearing from unintentionally separating.

\* \* \* \* \*